Patented Oct. 19, 1954

2,692,277

UNITED STATES PATENT OFFICE 2,692,277

MANUFACTURE OF CYCLOHEXANOLS AND ESTERS THEREOF, FROM ISOPROPYL ALCOHOL OR SECONDARY BUTYL ALCOHOL

William Edgar Nelson, Newport, Wales, assignor to The Distillers Company Limited, Edinburgh, Scotland, a British company No Drawing. Application April 28, 1950, Serial No. 158,939

Claims priority, application Great Britain May 6, 1949

6 Claims. (Cl. 260—475)

The present invention relates to the manufacture of cyclic alcohols and to esters thereof.

According to the invention the process for the preparation of cyclic alcohols comprises subjecting an alcohol selected from the group consisting of isopropyl alcohol and secondary butyl alcohol in the liquid phase in the presence of alkali metal hydroxide or alkali metal alcoholate to temperatures in excess of 250° C. and separating the cyclic alcohol produced from the reaction mixture. The cyclic alcohols may be esterified before or after separation from the reaction mixture, to give the corresponding esters.

The separation of the cyclic alcohol from the reaction mixture may be effected by careful fractional distillation, preferably under diminished pressure, of the reaction mixture resulting from the condensation reaction. On distilling, advantageously after previous neutralisation, first unchanged alcohol distills over, then any low boiling products, such for example as methyl isobutyl carbinol, which is also formed by the condensation of isopropanol, which may be formed during the heating. Finally the cyclic alcohol is collected in that fraction which corresponds to its boiling point at the given pressure. This fraction, if sufficiently pure, may crystallise on cooling to room temperature or somewhat below room temperature. If necessary, or desired, this fraction may be subjected to further refractionation.

The amount of alkali metal hydroxide or alkali metal alcoholate employed in the reaction is non-critical and may vary within wide limits. Amounts of 1 to 10% of the alkali metal hydroxide or alcoholate calculated on the alcohol starting material give satisfactory results. It is prefered to use potassium hydroxide as the alkali metal hydroxide. It is to be noted that in place of using an alkali metal alcoholate per se, the alcohol starting material may be mixed with an alkali metal hydroxide and the mixture dehydrated for example by distillation in the presence of a small amount of benzene, and the resulting solution, which will contain the corresponding alkali metal alcoholate, used for the reaction. The temperature at which the reaction is carried out is advantageously between 250° and 300° C. The temperature employed must not be in excess of that at which the reaction mixture will no longer be in the liquid phase. The upper limit of the temperature which may be employed is accordingly the critical temperature of the liquid reaction mixture. In order to maintain the alcohol during the reaction in the liquid phase the reaction is carried out under pressure. During the reaction, which may be effected either batchwise or as a continuous process, hydrogen is liberated.

The alcohol starting material may be subjected to the process of the invention either alone or in the presence of an inert solvent, which suitably reduces the pressure needed to maintain the alcohol in the liquid phase during the reaction, for example a hydrocarbon boiling appreciably above the boiling point of the alcohol being reacted. Methyl isobutyl carbinol is a suitable solvent when the alcohol starting material is isopropyl alcohol, and it is thus possible to recycle the methyl isobutyl carbinol which has been formed during the reaction or added initially together with unchanged isopropyl alcohol.

The process according to the invention may preferably be carried out in metal vessels such as autoclaves of mild steel or stainless steel, or nickel lined vessels. It has been found useful to add to the reaction mixture small amounts of a finely divided metal, such as copper-bronze, for catalysing the condensation of the alcohol starting material.

The yield of the cyclic alcohol and the speed of the reaction varies according to conditions of the reaction such as pressures, temperatures and amounts of alkali metal hydroxide used. Thus, for example, increase in the pressure and/or temperature and/or amount of alkali will result in an increase in the speed of the reaction. It has further been ascertained that by increasing the total conversion of alcohol starting material, an increase in the yield of cyclic alcohol is obtained, at the expense of the lower boiling condensation products of the alcohol starting material. It is, therefore, a preferred method of carrying out the process of the invention by condensing more than 20% of the alcohol introduced.

The condensation of isopropyl alcohol according to the present invention gives 1:1:3-trimethylcyclohexanol-5.

The process of the invention thus leads in one single operation from isopropyl alcohol to 1:1:3-trimethylcyclohexanol-5, and, therefore, offers a very simple and cheap method for producing this compound which had hitherto been obtained only by the hydrogenation of isophorone. 1:1:3-trimethylcyclohexanol-5 may be used as an intermediate for a number of compounds having very valuable properties; the use of isopropyl alcohol as the starting material thus constitutes an unexpected and cheap method of obtaining these compounds.

The condensation of isobutyl alcohol according to the present invention gives a substituted cyclohexanol of 12 carbon atoms.

Esterification of the cyclic alcohol can be effected with or without isolation of the cyclohexanol from the condensation product by any method known or used in the art for the esterification of alcohols. Thus for example the 1:1:3-trimethylcyclohexanol-5 prepared by the condensation of isopropyl alcohol may be treated with the anhydride of a carboxylic acid suitably in the presence of an esterification catalyst such as sulphuric acid, or it may be treated with the carboxylic acid in the presence of an esterification catalyst and suitably also in the presence of a water entrainer such as benzene. The present invention relates particularly to 1:1:3-trimethyl-cyclohexyl-5 acetate and the mono- and di- esters of 1:1:3-trimethylcyclohexanol-5 and phthalic acid, sebacic acid and adipic acid. The esters of 1:1:3-trimethylcyclohexanol-5 have valuable properties as plasticisers:

The following examples are given to illustrate the process of the present invention. The percentages quoted are by weight unless otherwise indicated.

*Example 1*

In a 10-liter autoclave made of stainless steel, 5 litres of dry isopropyl alcohol containing 8% potassium hydroxide is heated to 290° C. for 4 hours. The liquid reaction product is washed with a small amount of water and the top layer neutralized with acetic acid and then fractionated in the presence of water. The lowest boiling fraction contains some olefines. The next fraction, boiling between 78° and 88° C. at normal pressure, contain the unconverted isopropyl alcohol, and the fraction boiling between 88° and 97° C. contains the methyl isobutyl carbinol-water constant boiling mixture. The oil in the still kettle is now separated from the water and fractionated separately at 16–20 mm. pressure. A fraction boiling between 85° and 110° C. at 16 mm. is collected and is identified as almost pure 1:1:3-trimethylcyclohexanol-5. It crystallises on standing and is purified by a refractionation at normal pressure. The main fraction comes over at 196.5°–198° C. at 742 mm. and the crystals of the distillate have a melting point of 32.5° C. In the above experiment 45% of the original isopropanol is converted, 29.8% going to methyl isobutyl carbinol, 11% to trimethylcyclohexanol and 4.1% to a mixture of $C_9$ and $C_{12}$ alcohols. 4.2% of the potassium hydroxide originally added, is converted to other compounds during the reaction.

A convenient way of isolating the 1:1:3-trimethylcyclohexanol-5 from the condensation products of isopropyl alcohol is to fractionate the reaction products after the removal of unchanged isopropanol and at least part of the methyl isobutyl carbinol, under reduced pressure, and collect the fraction of the $C_9$ range which has a density of more than 0.87 at 20° C. Thus, in one experiment the condensation product is neutralised, isopropyl alcohol and methyl isobutylcarbinol removed as azeotropes with water and, finally, the remaining oil layer fractionated at a pressure of 17 mm. This distillate comes over from 85°–105° C. It possesses a specific gravity of 0.921 at 15° C. The fraction solidifies when cooled below 15° C. On refractionation pure 1:1:3-trimethylcyclohexanol-5 is obtained, having a boiling point of 196° C. at 752 mm. The specific gravity of this alcohol is 0.887 at 37° C.

*Examples 2–4*

Isopropyl alcohol containing 8% by weight of potassium hydroxide is mixed with a little benzene and dehydrated in a still, by removing continuously the lower layer of the ternary azeotrope which distils. The resulting solution, in which more than half of the potassium hydroxide has been converted to potassium isopropylate is pumped continuously to the reactor, which consists of a heated vertical stainless steel tube, of ¾ inch bore and 300 millilitres capacity. The feed enters at the top of the tube at the rate of 150 millilitres per hour, and product is removed from the base in such a way that a column of liquid reaction mixture is maintained in the heated reaction tube. Provision is also made for separating any aqueous layer formed by the reaction. The reactor is initially pressurised to 80 atmospheres pressure and maintained at this pressure by venting the gas produced. A constant temperature within the range 250°–300° C., as indicated in the table below, is used.

The product obtained is distilled in the presence of water to remove first small amounts of hexenes and acetone, followed by unchanged isopropanol. The aqueous layer is then separated, and the oil residue distilled, yielding methyl isobutyl carbinol (boiling point 40–50° C. at 10 millimetres of mercury), and 1:1:3-trimethylcyclohexanol-5, (boiling point 85–105° C. at 10 millimetres of mercury). Refractionation of the latter gives pure 1:1:3-trimethylcyclohexanol-5, (boiling point 90–100° C. at 10 millimetres of mercury), which crystallises on cooling.

The results obtained in these examples are given in the following table:

| Example | Reaction temp., ° C. | Percent conversion of isopropyl alcohol | Percent yield of 1:1:3-trimethylcyclohexanol-5 | Percent yield of methyl isobutyl carbinol |
|---|---|---|---|---|
| 2 | 250 | 30.4 | 31.7 | 39.8 |
| 3 | 274 | 36.5 | 37.7 | 20.5 |
| 4 | 296 | 39.6 | 40.9 | 11.5 |

*Example 5*

In a 10-litre autoclave made of stainless steel, 5 litres of dry isopropanol containing 8% potassium hydroxide is heated to 290° C. for 4 hours. The liquid reaction product is washed with a small amount of water and the top layer neutralised with acetic acid and then fractionated in the presence of water. The lowest boiling fraction contains some olefine. The next fraction, boiling between 78° C. and 88° C. at normal pressure, contains the unconverted isopropanol, and the fraction boiling between 88° and 97° C. contains the methyl isobutyl carbinol-water constant boiling mixture. The oil in the still kettle is now separated from the water and fractionated separately at 16–20 mm. pressure. A fraction boiling between 85° and 110° C. at 16 mm. is collected and identified as almost pure 1:1:3-trimethylcyclohexanol.

The pure 1:1:3-trimethylcyclohexanol-5 thus obtained is heated with acetic anhydride and a trace of sulphuric acid. The product obtained is fractionally distilled, and the 1:1:3-trimethylcyclohexyl acetate, boiling at 210° C. at normal pressure, separated.

Example 6

200 grams of 1:1:3-trimethylcyclohexanol-5, prepared as in Example 1, 95 grams of sebacic acid, 47.5 grams of benzene and 0.18 grams of concentrated sulphuric acid are heated at a reaction temperature between 135° and 145° C. in an apparatus fitted with a Dean Stark head, the water being removed as an azeotrope with the benzene. The time taken for the reaction is 11½ hours. The product is washed with aqueous sodium carbonate to remove unchanged acid and the organic layer separated and fractionally distilled under reduced pressure. The di-1:1:3-trimethylcyclohexyl 5 sebacate, boiling at 220°–225° C. at 0.2 millimetres of mercury is separated. The saponification value of the ester is 96.5% of the theoretical.

Example 7

106.5 grams of 1:1:3-trimethylcyclohexanol-5, 36.5 grams of adipic acid, 20 grams of benzene and 0.1 millilitre of concentrated sulphuric acid are admixed, and then heated under reflux, the water formed being removed by an azeotropic distillation head. After 2 hours, when the theoretical amount of water (9 millilitres) has been removed, the mixture is poured into 200 millilitres of 10% sodium carbonate solution and allowed to stand overnight. The benzene solution of the ester is washed with four 100 millilitre portions, stripped of benzene and water and then distilled and di(1:1:3-trimethylcyclohexyl) adipate collected as a viscous liquid.

Example 8

106.5 grams of 1:1:3-trimethylcyclohexanol-5, 37 grams of phthalic anhydride, 20 grams of benzene and 0.1 millilitre of concentrated sulphuric acid are admixed, and then heated under reflux, the water formed being removed by an azeotropic distillation head. After 2 hours, when the theoretical amount of water (9 millilitres) has been removed, the mixture is poured into 200 millilitres of 10% sodium carbonate solution and allowed to stand overnight. The benzene solution of the ester is washed with four 100 millilitre portions, stripped of benzene and water and then distilled and di(1:1:3-trimethylcyclohexyl) phthalate collected as a viscous liquid.

Example 9

400 grams of dry secondary butyl alcohol are heated with 57 grams of potassium hydroxide in a stainless steel autoclave for 4 hours at 250° C. At the termination of the reaction there is a pressure of 30 atmospheres in the autoclave after cooling. The condensation reaction product is separated, washed with water, and distilled. The lower boiling fractions which are obtained comprise unchanged, secondary butyl alcohol, and then a fraction, boiling at 76.5° C. at 12.5 millimetres of mercury, comprising an octyl alcohol is obtained and finally a fraction boiling at 119°–122° C. at 12 millimetres of mercury pressure is separated which comprises the substituted cyclohexanol of the formula $C_{12}H_{24}O$. The purified alcohol boils at 120° C. at 10 mm. of mercury pressure. Oxidation of said alcohol yielded a ketone B. Pt. 111° C. at 10 mm. mercury pressure and the 2:4-dinitrophenylhydrazone derivative of this ketone had M. Pt. of 82° C.

Example 10

Secondary butyl alcohol containing 15% weight by volume of potassium secondary butylate is continuously pumped at 320 millilitres per hour into the upper end of a tubular reactor, 660 millilitres in volumes, which is electrically heated to 264°–266° C. and pressurised with nitrogen to 30 pounds per square inch gauge. This pressure was maintained by the release of hydrogen through a needle valve at the rate at which it was formed in the reaction. The product is removed continuously from the lower end of the reactor through a constant level siphon tube, which serves to maintain a column of the liquid reaction mixture in the reactor, and is collected in a pressurised receiver. The product, after washing with water to remove potash and potassium salts, is distilled to separate the unchanged secondary butyl alcohol, and then fractionated, giving a fraction boiling between 75° and 89° C. at 27 millimeters of mercury, which contains an octyl alcohol, and then a fraction boiling between 125° and 138° C. at 16 millimetres of mercury pressure. On refractionation of this last fraction, a fraction boiling at 130–132° C. at 16 millimetres of mercury comprising a substituted cyclohexanol of the formula $C_{12}H_{24}O$ is separated. This substituted cyclohexanol has a density $d_4^{20}$ of 0.9081 and a refractive index $n_D^{20}$ of 1.4729.

1:1:3-trimethylcyclohexanol-5 possesses valuable solvent properties, and can be used to advantage to replace other alcohol solvents in their uses in various fields.

I claim:

1. A process for the preparation of a cyclohexanol, which comprises the step of condensing an alcohol selected from the group consisting of isopropyl alcohol and secondary butyl alcohol, by heating in the liquid phase to a temperature in the range of about 250° C. to 300° C. in the presence of an alkaline material selected from the group consisting of alkali metal hydroxide and alkali metal alcoholate of the involved alcohol, whereby the corresponding cyclohexanol is produced.

2. A process for the preparation of cyclohexanols which comprises condensing an alcohol selected from the group consisting of isopropyl alcohol and secondary butyl alcohol, by heating in the liquid phase to a temperature in excess of 250° C. in the presence of an alkaline material selected from the group consisting of alkali metal hydroxide and alkali metal alcoholate of the involved alcohol and thereafter distilling the reaction mixture to separate the cyclohexanol produced.

3. A process for the preparation of cyclohexanols which comprises condensing an alcohol selected from the group consisting of isopropyl alcohol and secondary butyl alcohol, by heating in the liquid phase to a temperature in the range of about 250° C. to 300° C. in the presence of a member selected from the group consisting of alkali metal hydroxide and alkali metal alcoholate of the involved alcohol, and thereafter distilling the reaction mixture to separate the cyclohexanol produced.

4. A process for the preparation of cyclohexanols which comprises admixing an alkali metal hydroxide with an alcohol selected from the group consisting of isopropyl alcohol and secondary butyl alcohol, dehydrating the mixture, then heating said mixture to a temperature in the range of about 250° C. to 300° C., and thereafter separating the cyclohexanol produced from the reaction mixture.

5. A process for the preparation of 1:1:3-trimethylcyclohexanol-5 which comprises condensing isopropyl alcohol by heating in the liquid phase to a temperature in the range of about 250° C. to 300° C. in the presence of an alkaline material selected from the group consisting of alkali metal hydroxide and alkali metal isopropylate and thereafter separating from the reaction mixture the 1:1:3-trimethylcyclohexanol-5 produced.

6. In a process for the preparation of esters of cyclohexanols, the steps of condensing an alcohol selected from the group consisting of isopropyl alcohol and secondary butyl alcohol, by heating in the liquid phase to a temperature in excess of 250° C. in the presence of an alkaline material selected from the group consisting of alkali metal hydroxide and alkali metal alcoholate of the involved alcohol, whereby the corresponding cyclohexanol is produced thereafter esterifying the cyclohexanol thus produced without separation thereof from the reaction mixture, and thereafter separating the resultant ester.

References Cited in the file of this patent

UNITED STATES PATENTS

| Number | Name | Date |
| --- | --- | --- |
| 1,797,612 | Jordan | Mar. 24, 1931 |
| 1,841,430 | Bollmann | Jan. 19, 1932 |
| 1,923,938 | Kyrides | Aug. 22, 1933 |
| 2,026,668 | Bruson et al. | Jan. 7, 1936 |
| 2,403,804 | Kesslin et al. | July 9, 1946 |
| 2,451,739 | Isler | Oct. 19, 1948 |
| 2,473,544 | Rehberg et al. | June 21, 1949 |
| 2,497,433 | Blake | Feb. 14, 1950 |
| 2,499,848 | Catlin et al. | Mar. 7, 1950 |

OTHER REFERENCES

Guerbet: Compt. rend., vol. 149, pp. 129–132 (1909).

Beilstein: "Handbuch der organischen Chemie," vol. 6 (1923), page 22.